Inventor
Ralph B. Otwell
By S. E. Thomas
Attorney

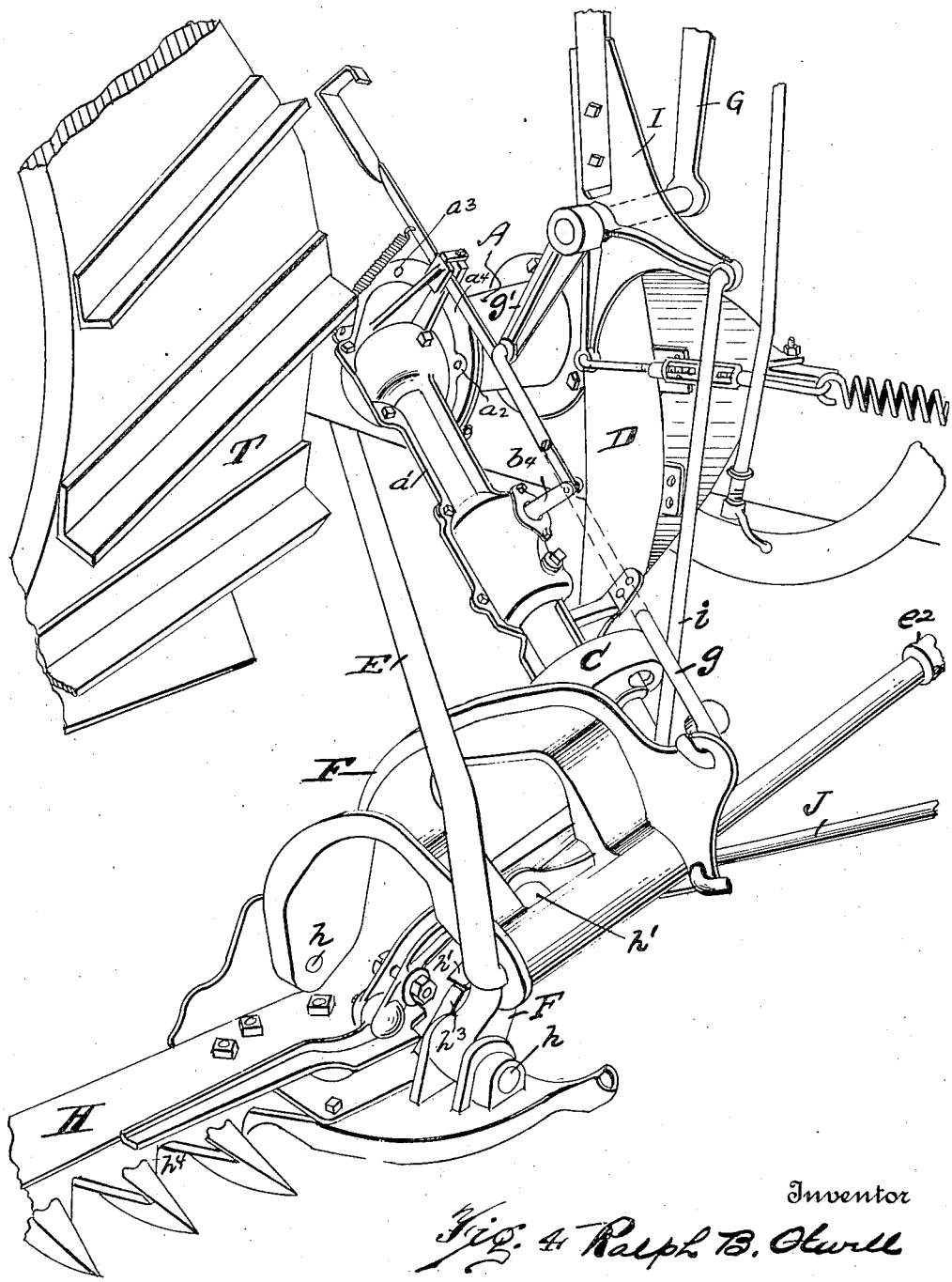

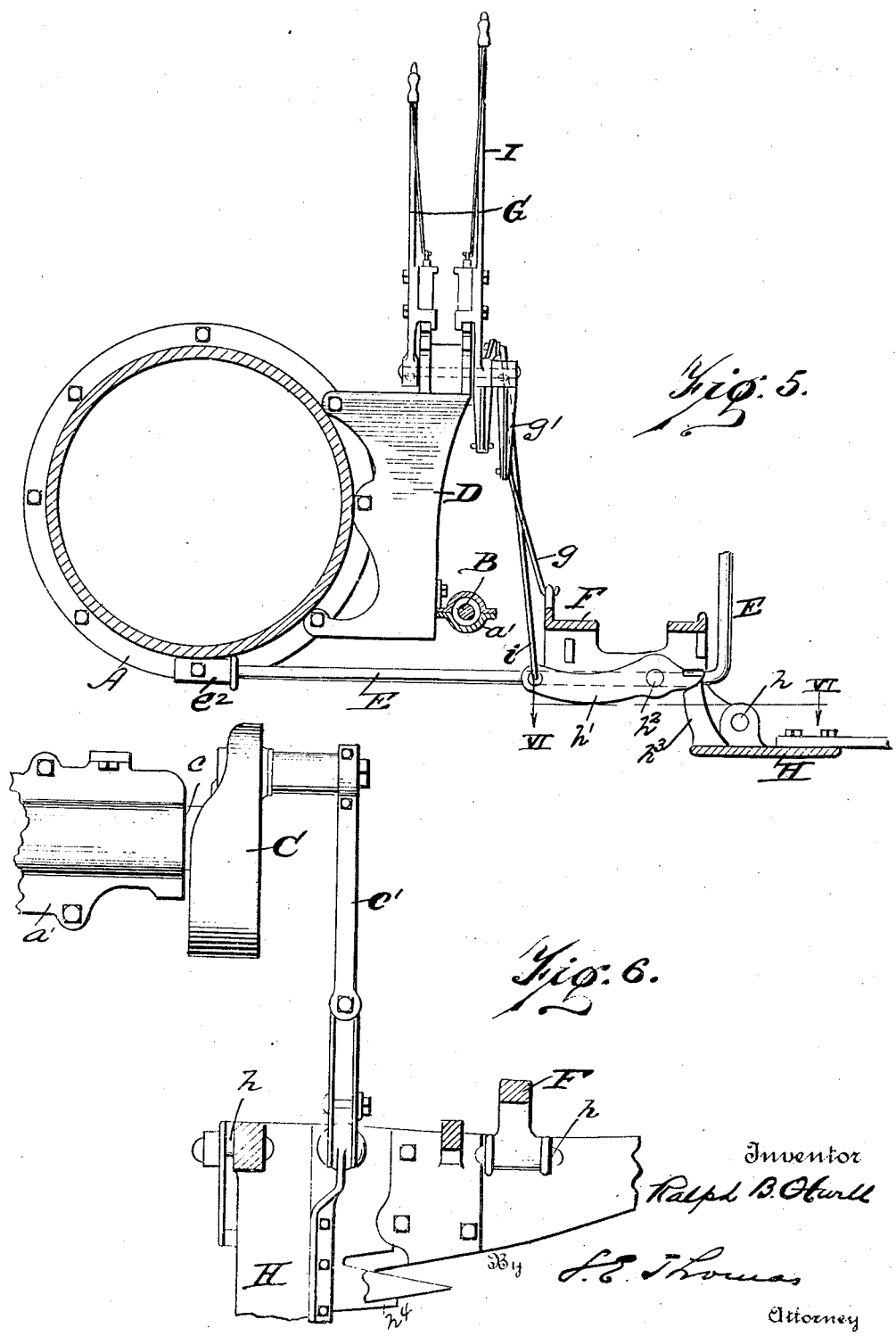

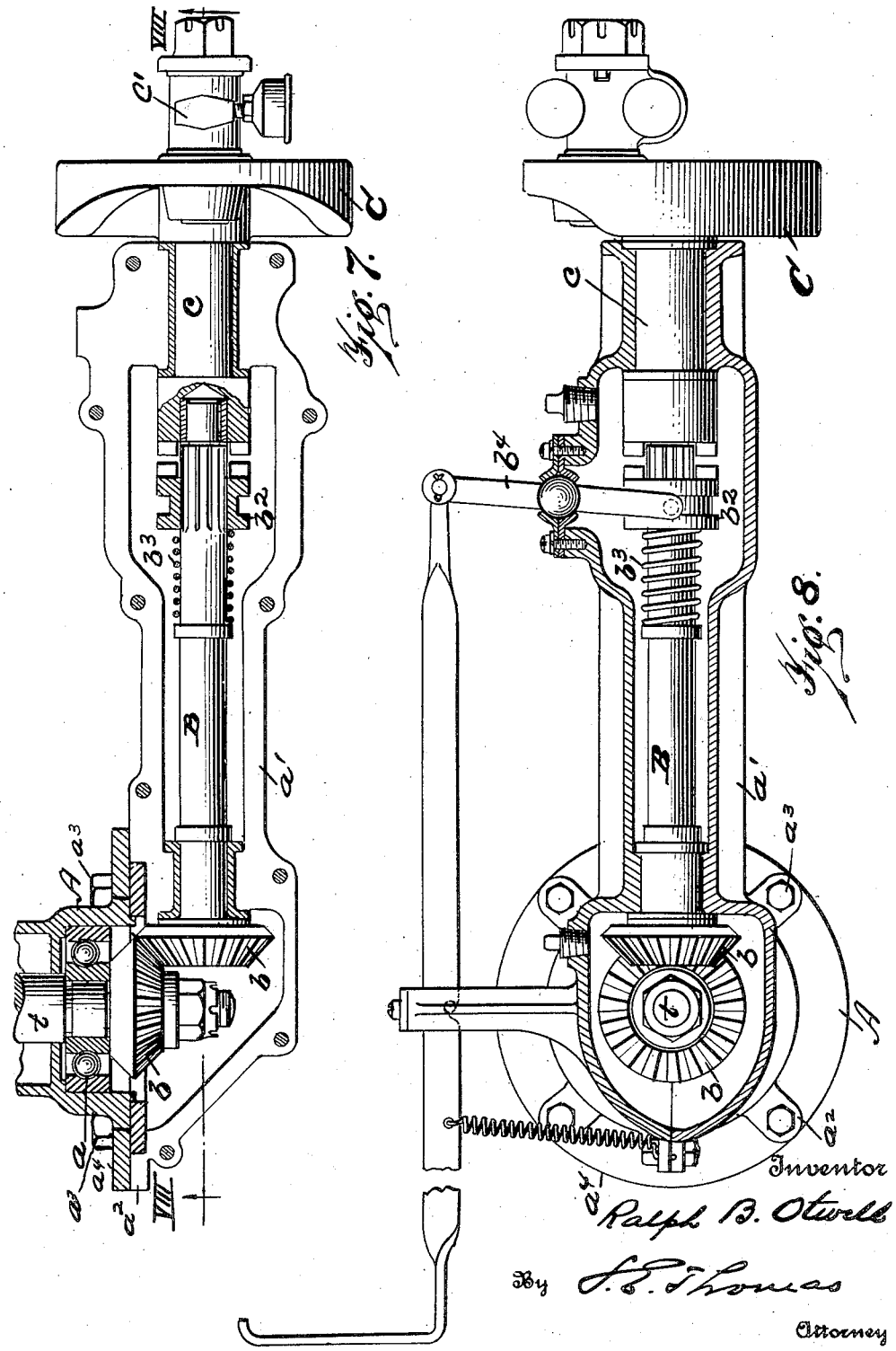

Patented Jan. 30, 1923.

1,443,379

UNITED STATES PATENT OFFICE.

RALPH B. OTWELL, OF DETROIT, MICHIGAN.

TRACTOR.

Application filed February 20, 1920. Serial No. 360,037.

*To all whom it may concern:*

Be it known that I, RALPH B. OTWELL, citizen of the United States, residing at Detroit, county of Wayne, State of Michigan, have invented a certain new and useful Improvement in Tractors, and declare the following to be a full, clear, and exact description of the same, such as will enable others skilled in the art to which it pertains to make and use the same, reference being had to the accompanying drawings, which form a part of this specification.

This invention relates to an attachment for tractors whereby the cutter bar of a mowing attachment may be driven directly from the take-off shaft of the tractor through the attachment which is rigidly secured to the tractor but in such a manner as to permit ready adjustment of the mower bar to meet any condition of service, the device also being arranged so that it may be adapted for transmitting power for other purposes.

A feature of the invention lies in the disposition of parts so that the mower bar is at substantially the longitudinal center of the tractor, or midway, longitudinally, between the forward and rear bearing wheels thereof, and a further advantage is the carrying of the draft strain to the central, longitudinal plane or line of the tractor itself, thus eliminating, to a certain extent any side pull.

The invention consists in the matters hereinafter set forth, and more particularly pointed out in the appended claims.

In the drawings:

Figure 4 is a view in perspective showing a mowing bar and immediate connections and control levers;

Figure 5 is a view, partially in elevation and partially in section, showing adjusting levers for holding the cutter bar in desired position.

Figure 6 is a view in detail showing a pitman drive connection with the cutter bar;

Figure 7 is a view, partially in section and partially in elevation, of a main driving shaft and clutch, together with a pitman take-off, and Figure 8 is a view, partially in section and partially in elevation, of the mechanism indicated in Figure 7 taken on section line 8—8 of Figure 7.

Figure 1:
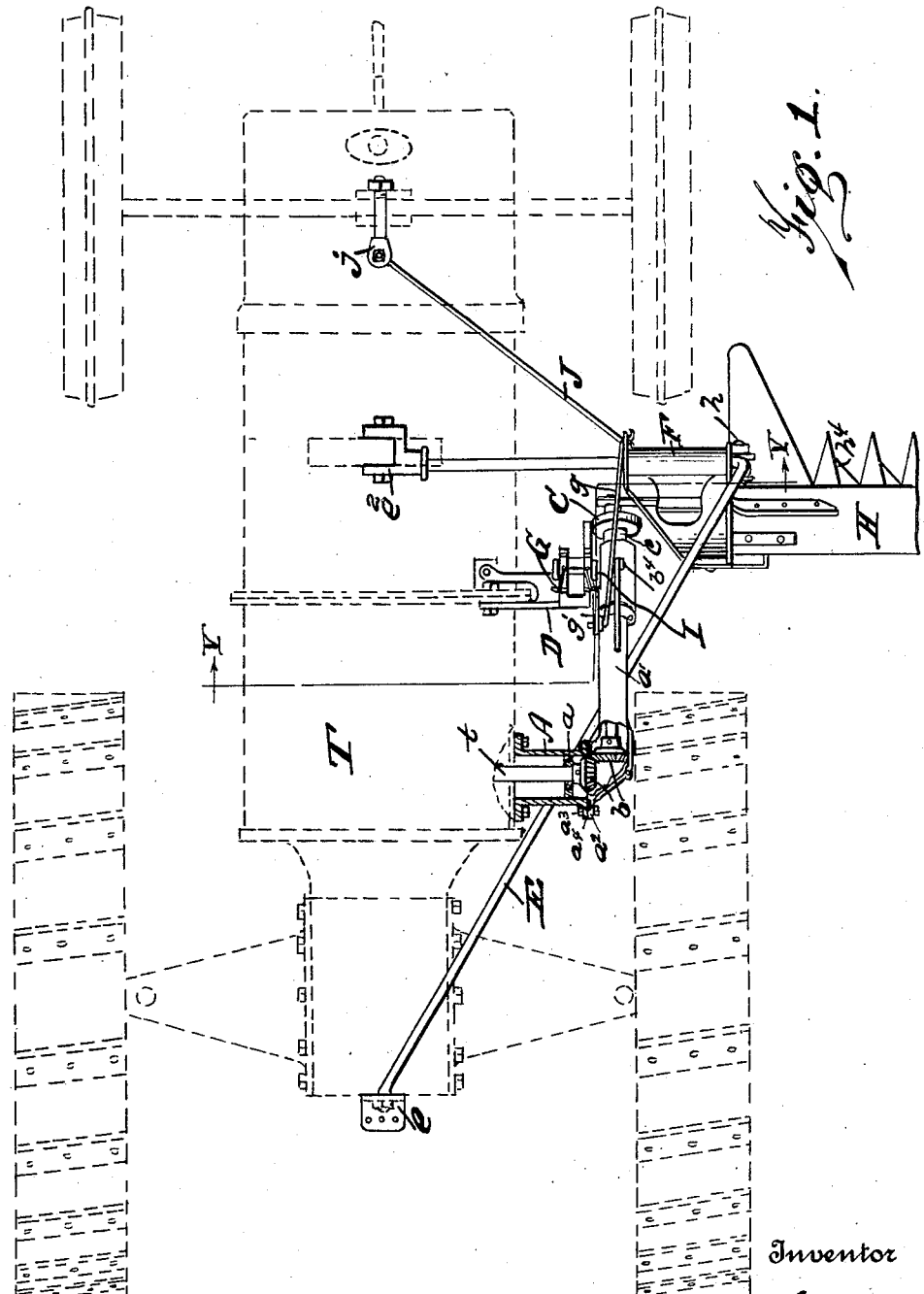
Figure 1 is a plan view, partially broken away and in section, of a device embodying the invention applied to a tractor which is indicated in dotted lines.
Figure 2:
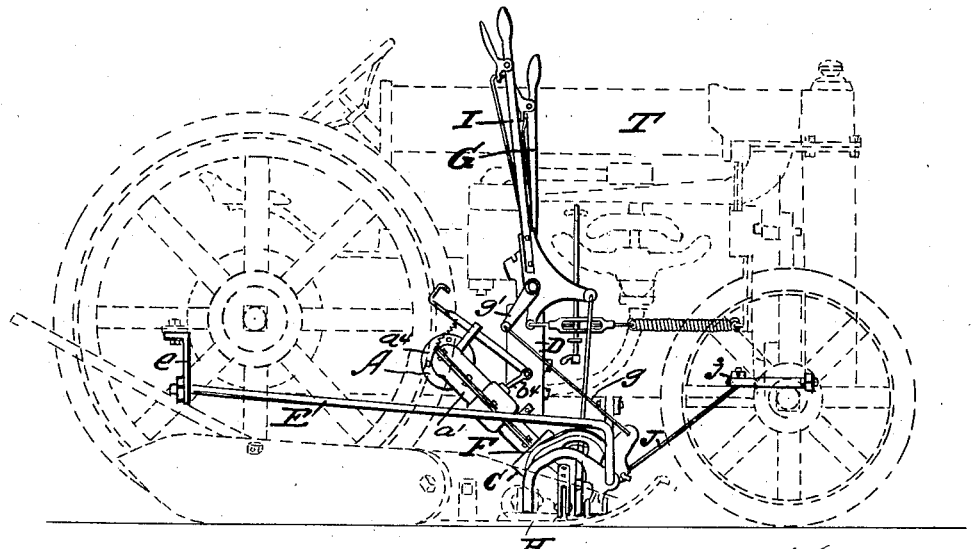
Figure 2 is a view in side elevation of the device, with parts shown in dotted lines, and with the tractor indicated in dotted lines.

Referring to the drawings a tractor T has a take-off or power shaft $t$ disposed in the usual position. A main supporting casing A is rigidly secured to the body of the tractor as a housing for the shaft $t$, there being a bearing $a$ in the casing for this shaft.

An extension $a^1$ of the casing A is secured to extend transversely thereto by means of a flange $a^2$ thereon appropriately secured as by bolts $a^3$ to an end flange $a^4$ of the casing A. This flange coupling permits the disposition of the extension $a^1$ in the desired angular or horizontal position. A main drive shaft B is journalled in the extension $a^1$ and is connected to the power shaft $t$ by a pair of beveled pinions $b$. A pitman wheel C is keyed or otherwise made fast on a pitman wheel shaft $c$ journaled in the extension $a^1$ in alinement with the main drive shaft B, the latter having its end portion stepped into the pitman shaft. A clutch collar $b^2$ longitudinally reciprocable and non-rotatable on the shaft B, is adapted to engage the suitably machined portion of the shaft $c$ and thereby drive the latter, disengagement of the clutch against the action of a spring $b^3$, being effected by a lever $b^4$ pivoted in the extension $a^1$. A lever bracket frame D is secured to the body of the tractor in such position that the extension $a^1$ may be rigidly bolted thereto in any one of its adjusted positions.

A brace member E is rigidly secured at its rear end to a hanger $e$ depending from the rear end of the tractor to which it is attached so as to lie in the central, longitudinal axial plane of the tractor, while the forward end of the brace member which is bent between its ends as indicated, is made fast to the under side of the tractor in substantially the same longitudinal plane by suitable brackets $e^2$.

The brace E provides a pivotal support on which the heel yoke F of a cutter bar may be oscillated by means of a link $g$ connecting the heel yoke to a rock arm $g^1$ operated by a hand lever G pivoted on the bracket D. A mower bar H is hinged on the heel yoke in the usual manner as at $h$, to be tilted up or down through the medium of a link $i$ coupling the gag lever $h^1$ of the mower bar and a hand lever I likewise mounted on the bracket D. The gag lever $h^1$ is pivoted at $h^2$ to the heel yoke F, its free end bearing upon an upstanding lug $h^3$ on the mower bar.

The pitman wheel C on the shaft $c$ is coupled by a pitman rod $c^1$ with the knife $h^4$ of the mower bar whereby the latter may be reciprocated whenever the clutch operated by the lever $b^4$ is engaged.

To lessen the draft of the heel yoke F on the brace E, a draw bar J is hooked into the heel yoke and is connected at its forward end to a suitable I-bolt $j$ or like means rigidly secured under the tractor in the longitudinal, axial plane of the latter.

Figure 3:
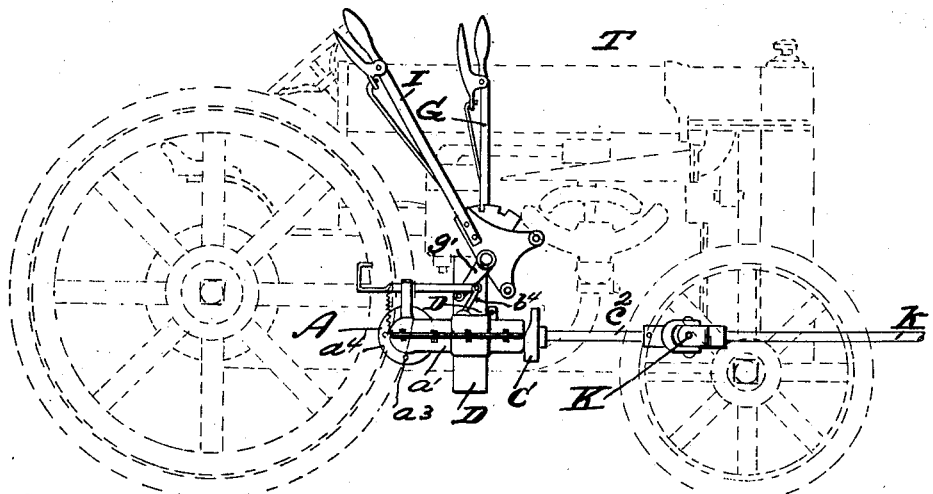
Figure 3 is a view in side elevation showing an adjustment of the device in raised position for certain uses.

The extension may be raised into horizontal position as indicated in Figure 3 with a rod $C^2$ in substantially axial alinement with the drive shaft B to drive anything at the forward end of the machine by the use of a universal joint indicated generally at K, there being a forwardly extending shank $k$ extending from this universal joint. The braces J and E are removed when desirous of moving the heel yoke F into position shown in Fig. 3.

As a result of this construction an attachment for a tractor is obtained which forms a unit structure by itself so secured to the tractor as to communicate all drafts to the medial longitudinal axis of the latter while at the same time it is adjustable to carry a mowing bar in any desired position or to transmit power forward of the tractor from the take-off shaft. When the mower bar is attached, the latter lies at substantially the longitudinal center of the machine while the means for manipulating the mower bar are within easy reach of the driver.

Obviously, changes in the details of construction may be had without departing from the spirit of my invention and I do not care to limit myself to any particular form or arrangement of parts.

What I claim is:

1. In an attachment for tractors, a take-off shaft, a main casing rigidly secured to the tractor and provided with a shaft driven from the take-off shaft of the tractor which the casing houses, a power transmitting member journaled in the casing and rotated by the driving shaft through the medium of a releasing clutch within the casing, a control lever for the clutch pivoted on the casing, a mower bar, a brace member secured to the tractor in substantially the central medial plane thereof on which the mower bar is angularly adjustable at a point coincident substantially with the longitudinal center of the tractor, means connecting the cutter bar of the mower attachment with the power member in the casing, and controlling and adjusting levers for the mower bar.

2. An attachment for tractors comprising a take-off shaft, a sectional casing, means for securing one section of the casing rigidly to the tractor around the power take-off shaft, a second section angularly adjustable on the first section and at right angles to the power take-off shaft, a power transmitting member on the outer end of the latter section of the casing, a driving shaft in the second section, driving connections in the said casing between the power take-off shaft and the power transmitting member including a releasing clutch with the control thereof on the second section, a one piece diverging brace secured rigidly to the tractor along the central medial plane thereof, a mower bar having a pivotal connection with the brace at substantially the longitudinal center of the tractor with the cutter bar thereof operatively connected to the power transmitting member on the casing, a draft bar secured to the tractor near the central medial line thereof and attached to the mower bar and levers for manipulating and adjusting the mower bar.

3. An attachment for tractors, a casing constructed for connection with a tractor and having angularly adjustable relation to a power take-off shaft of the tractor and provided with a driving member arranged to be operated by the power take-off shaft through a disengaging clutch, a mower bar the cutter of which is reciprocated by the driving member and supporting means secured to the tractor along substantially the medial vertical, longitudinal plane thereof, on which the mower bar is adjustably mounted.

4. An attachment for tractors comprising a power take-off shaft, a casing encircling the same, a second casing secured at right angles thereto and adjustable angularly thereon, a driving member rotatable in the casing, a transmission shaft between the power shaft and the driving member, connected to the latter by a clutch, said clutch and shaft being housed by the second casing, a mower bar, the cutter of which is reciprocated by the driving member, and supporting means secured to the tractor along substantially the medial, vertical longitudinal plane thereof, on which the mower bar is adjustably mounted.

5. In a tractor attachment, a casing enclosing a power take off shaft, a casing extension connected thereto for rigid angular adjustment, a transmission shaft and driven member carried by the casing extension, and connected to the power take off shaft, a mower bar pivotally supported from the tractor at points in the vertical medial longitudinal plane thereof, means for connecting the driven member and mower bar and means for elevating the mower bar to various horizontal positions.

6. In a tractor attachment, a casing constructed to receive the power shaft of the tractor, a second casing having means for adjustably securing the same to the power shaft casing, a driving member having operative connection with the power shaft, a driven member, a clutch for connecting and disconnecting the driving and driven members, a mower bar including a cutter having connection with the driven member for reciprocation thereby, and means constructed and arranged for connection with the tractor for supporting the mower mechanism along substantially the medial vertical longitudinal plane of the tractor.

In testimony whereof, I sign this specification in the presence of two witnesses.

RALPH B. OTWELL.

Witnesses:
L. E. THOMAS,
EDWIN R. MONNIG.